United States Patent [19]

Thomas

[11] 4,265,315
[45] May 5, 1981

[54] HORSESHOE WITH A CONTINUOUS WEDGE-SHAPED CALK

[76] Inventor: Jerome P. Thomas, P.O. Box 74, Middleburg, Va. 22117

[21] Appl. No.: 45,256

[22] Filed: Jun. 4, 1979

[51] Int. Cl.³ ............................................. A01L 7/04
[52] U.S. Cl. ..................................... 168//29; 168/35
[58] Field of Search ...................... 168/29, 35, 37, 41, 168/43

[56] References Cited

U.S. PATENT DOCUMENTS

| | | | |
|---|---|---|---|
| 246,928 | 9/1881 | Watts | 168/12 |
| 308,449 | 11/1884 | Wallace | 168/12 |
| 599,350 | 2/1898 | Olson | 168/29 |
| 613,883 | 11/1898 | Hoppesch | 168/41 |
| 713,137 | 11/1902 | Nash | 168/4 |
| 737,908 | 9/1903 | Collins | 168/29 |
| 1,149,359 | 8/1915 | Garretson | 168/29 |
| 1,397,046 | 11/1921 | Haller | 168/24 |
| 1,951,700 | 3/1934 | Liepman | 168/29 |
| 2,197,166 | 4/1940 | Wheeler et al. | 168/4 |
| 2,543,330 | 2/1951 | Nardon | 59/36 |
| 2,791,280 | 5/1957 | Polioni | 168/29 X |
| 3,460,627 | 8/1969 | Teixeira | 168/29 |

FOREIGN PATENT DOCUMENTS 7798  6/1879  Fed. Rep. of Germany ............ 168/11

Primary Examiner—Gene Mancene
Assistant Examiner—Robert P. Swiatek
Attorney, Agent, or Firm—Finnegan, Henderson, Farabow, Garrett & Dunner

[57] ABSTRACT

A multi-purpose horseshoe which is light in weight and yet strong and durable, the horseshoe including a lightweight, aluminum U-shaped foot portion which has a continuous groove formed along substantially its entire length and continuous steel calk running along substantially the entire length of the foot portion. The calk includes a wedge-shaped portion having a pointed ridge projecting beyond the foot portion opposite to and at a constant distance from the flat of the foot portion and a continuous rib which is press-fitted within the continuous groove of the foot portion.

10 Claims, 3 Drawing Figures

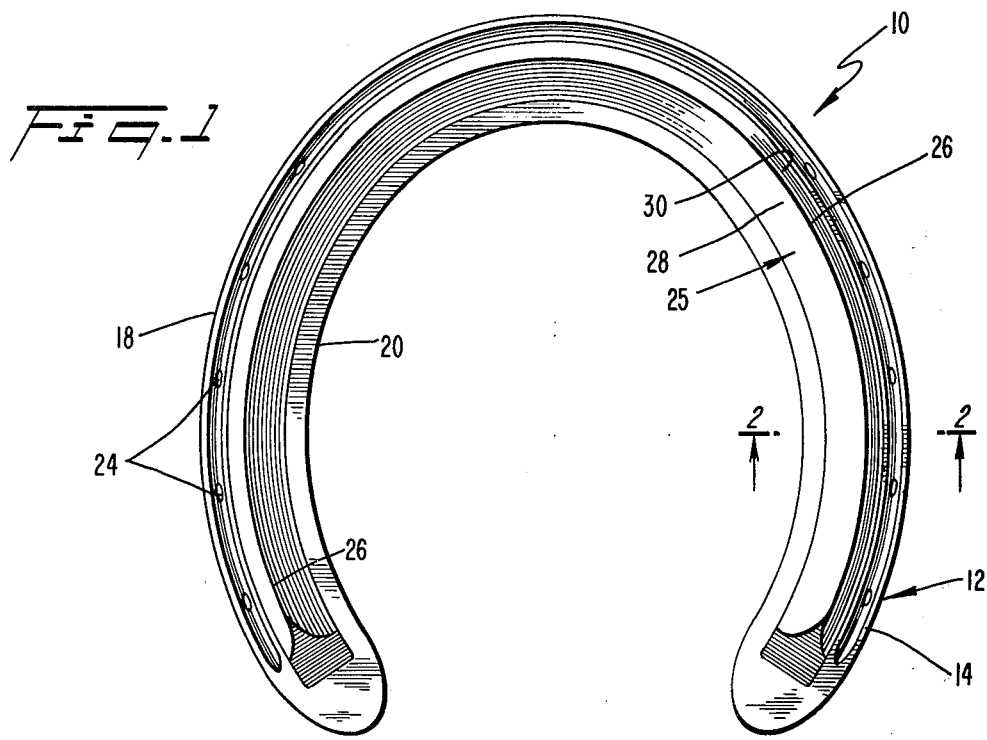
Fig. 1
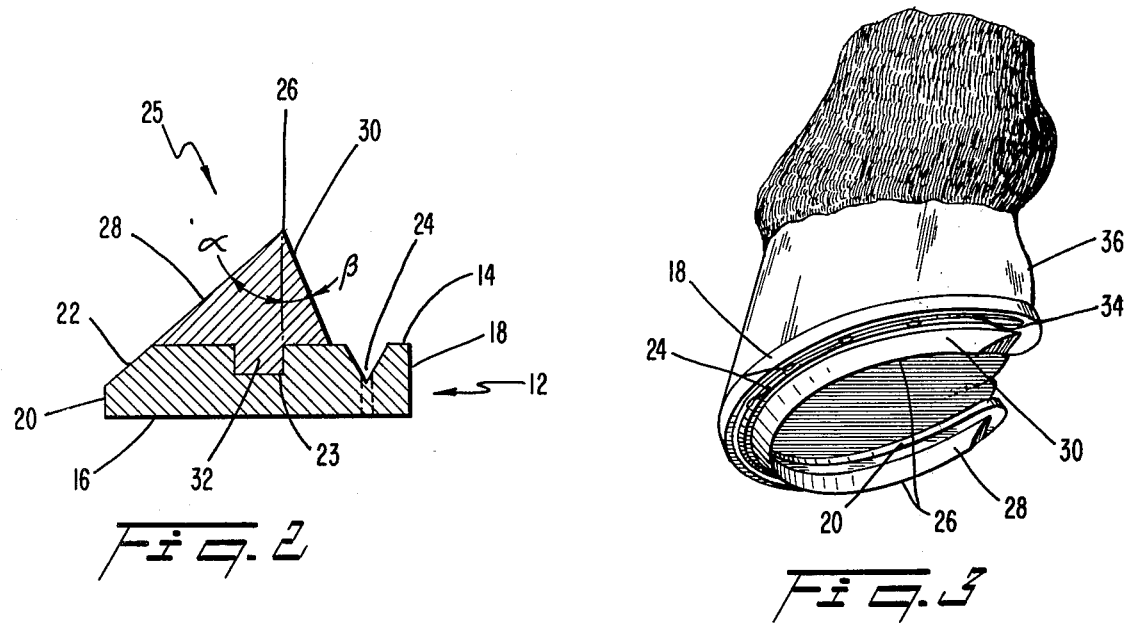
Fig. 2
Fig. 3

HORSESHOE WITH A CONTINUOUS WEDGE-SHAPED CALK

BACKGROUND OF THE INVENTION

1. Field of the Invention

The present invention relates to a horseshoe and, more particularly, to a horseshoe having a continuous wedged-shaped calk running along substantially its entire length.

2. Description of the Prior Art

In the past a wide variety of shoes has been utilized to protect horses' hoofs from injury and provide the horses with increased traction. The various conventional shoes, however, have all presented certain disadvantages.

Steel or cast iron horseshoes have conventionally been used to shoe horses for hunting. These shoes are durable and amply protect the horse's hoof, but are heavy and tend to tire and slow down the horse. Steel and cast iron shoes are too heavy to be effectively used for horse racing, polo, steeplechases, three-day events, quarter horse events, and horse shows where speed and quickness are important.

To provide lighter shoes, it has been conventionally known to make shoes from lighter metals such as aluminum. However, these lighter aluminum shoes do not provide the traction that steel shoes do, wear out more easily and, in fact, may break and thereby injure a horse's hoof. To at least partially overcome these problems, aluminum horseshoes have been made to include permanently fixed or removable calks or studs. While one or more of these calks or studs increases the traction of the aluminum shoe, a plurality of calks or studs does not measurably increase the overall strength and durability of the shoe. Furthermore, horseshoes having one or more such calks or studs do not allow the horse to stand with its hoofs in a level position. The resultant unnatural canting of the horse's hoof for a prolonged period of time can injure the horse's hoofs and legs.

Another conventional horseshoe, known as a polyshoe, is made completely of steel but is extremely narrow. This shoe is light in weight, but does not cover and protect much of the horse's hoof. Futhermore, polyshoes have a small weight-bearing surface and, therefore, place the impact and strain of running upon a small portion of a horse's hoof.

It is therefore an object of the present invention to provide a horseshoe which is light in weight, provides good traction, covers and protects a large portion of the horse's hoof and permits the horse to stand with its hoofs in a level position.

Other objects and advantages of the invention will be realized and attained by means of the instrumentalities and combinations particularly pointed out in the appended claims.

To achieve the objects and in accordance with the purpose of the invention, as embodied and broadly described herein, the invention comprises a U-shaped foot portion forming the body of the shoe and including a flat for lying against the horse's hoof, a continuous calk running along substantially the entire length of the foot portion and including a wedge-shaped portion having a pointed ridge projecting beyond the foot portion opposite to and at a constant distance from the flat, and means for securely attaching the continuous calk to the foot portion.

The horseshoe of this invention overcomes the problems of the prior conventional horseshoes by providing a lightweight horseshoe which is strong, durable and protective and which provides the horse with maximum traction. The U-shaped foot portion of the shoe is made of a lightweight metal such as aluminum which permits the use of a wide shoe without unduly increasing the shoe's total weight. The wedge-shaped calk is made of a heavier but stronger material such as steel and provides a shoe of increased strength and durability over conventional aluminum horseshoes. The continuity of the calk permits the horse to stand with its hoof in a flat, normal position; the pointed ridge of the calk provides a firm grip upon almost all surfaces; and the angled surface of the calk allows the shoe to slide rather than to catch on irregular surfaces and thereby avoid tripping the horse.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 1 is a bottom plan view of the horseshoe of the present invention.

FIG. 2 is a section view of the preferred embodiment of the invention taken along line 2—2 of FIG. 1.

FIG. 3 is a perspective view showing the preferred embodiment of the invention as applied to a horse's hoof.

DESCRIPTION OF THE PREFERRED EMBODIMENT

Reference will now be made in detail to the present preferred embodiment of the invention, an example of which is illustrated in the accompanying drawings.

The preferred embodiment of the invention is represented generally by the numeral 10 in FIG. 1. As shown in FIGS. 1 and 2, the horseshoe includes a U-shaped foot portion 12 forming the body of the shoe and including a lower surface 14 and a flat 16 for lying against the horse's hoof. The foot portion 12 also includes an outer wall 18, an inner wall 20, an inside inclined surface 22, a continuous groove 23 and nail holes 24. The foot portion 12 is formed of a lightweight material, and in the preferred embodiment is made from aluminum.

A continuous wedge-shaped calk, shown generally as 25, is securely attached to the portion of the horseshoe on the lower surface 14, opposite the flat 16. The calk 25 runs along substantially the entire length of the foot portion and includes a wedge-shaped portion having a pointed ridge 26, an inside, inclined surface 28, an outside, inclined surface 30 and a continuous rib 32. The ridge 26 projects beyond the lower surface 14 of the foot portion 12 opposite to the flat 16 and at a constant distance from the flat.

In accordance with the invention, the horseshoe includes means for securely attaching the continuous calk 25 to the foot portion 12. As embodied herein, the attaching means comprises a continuous groove 23 formed along substantially the entire length of the foot portion and a continuous rib 32 formed along substantially the entire length of the calk 25 and securely fitted within the continuous groove 23.

It is preferred that the inside, inclined surface 22 of foot portion 12 and the inside, inclined face 28 of calk 25 form a continuous inclined surface extending from ridge 26 to the inner wall 20 of the foot portion. This continuous inclined surface permits the shoe to slide over rather than catch irregular surfaces. Since the foot portion 12 is made of a lightweight material, the flat 16 can be made wide without unduly increasing the weight of the shoe. Such a wide flat protects more of the sole of the horse's hoof and provides a wider weight and impact distribution on the horse's hoof.

The wedge-shaped calk 25 is made from a strong, durable material and in the preferred embodiment is made from steel. While the calk 25 may be attached to the foot portion 12 by any conventional means, it is preferred that the calk and foot portion be pressure bonded so that the rib 32 is fixedly secured in groove 23.

It is preferred that the rib 32 run substantially along the entire length of the horseshoe. A continuous rib 32 provides a strong bond between the calk 25 and the foot portion 12 and precludes the piecemeal breakage of the calk from the foot portion.

As shown in FIG. 2, the inside, inclined face 28 of the calk 25 is inclined at an angle $\alpha$ to a line drawn through ridge 26 perpendicular to flat 16. Similarly, outside, inclined face 30 is inclined at an angle $\beta$. The angle $\alpha$ is selected to provide a continuous inclined surface formed by inside, inclined face 28 of the calk and inclined surface 22 of the foot portion. The angle $\beta$ is selected to bring the outer periphery of the ridge 25 as close as possible to outer wall 18 while still allowing room for nail holes 24. The angles $\alpha$ and $\beta$ can vary over a wide range, depending upon the specific application and size of the horseshoe. The applicant has, however, found than an $\alpha$ angle of 50° and a $\beta$ angle of 20° are preferred in a general application.

Applicant has found that the wedge-shaped steel calk greatly increases the strength and durability of the shoe without unduly increasing its weight. Furthermore, the wedge-shaped steel calk provides good traction and permits a horse to turn sharply without losing its footing. Since the ridge 26 is at a constant distance from the flat 16 of the shoe, the shoe also allows a horse to stand with its feet in a level position, thereby diminishing the stress on the horse's hoofs and legs.

FIG. 3 shows the shoe 10 as applied to a horse's hoof. As shown, the nail holes 24 are placed near the outer wall 18 of the foot portion so that the nails 34 can be driven by a blacksmith into the wall 36 of the horse's hoof. The wide foot portion 12 covers a large portion of the horse's sole.

It is to be understood that the above-described horseshoe can be made by a number of conventional means. Applicant suggests, however, that the drop forge method would be particularly applicable.

In the drop forge method, a preformed wedge-shaped steel calk would be placed into a die specifically designed for the horseshoe of the present invention. A rounded aluminum bar, cut and preshaped into the shape of a U would then be heated in a pre-forge furnace and placed in the drop forge and positioned over the calk and die. During the drop forging operation, the aluminum would form to the shape of the foot portion as described by the die, and the calk would be pressure bonded to the aluminum foot portion. The horseshoe could then be finished by punching nail holes in the shoe and cleaning, trimming and shining the shoe.

It is contemplated that the horseshoe of the present invention be formed into four standard sizes for front and hind hoofs and be fitted to a horse in the conventionally well-known manner. For example, a blacksmith can shape the aluminum foot portion 12 to the horse's hoof and can, if desired, form toe clips on the shoe.

It is believed that the above-described horseshoe can be used in a wide variety of applications. The horseshoe would be particularly applicable in applications where it is desired to have a lightweight shoe which nevertheless is strong, protective, durable and capable of providing good traction. Applicant believes that the shoes would advantageously be used for polo ponies, grass racers, steeplechase horses, flat race horses, show horses, quarter horses, hunters and three-day event horses. The invention's characteristics of maximum wear, traction and protection, combined with its minimum weight, makes the shoe superior to the shoes currently used in the above applications.

It will be apparent to those skilled in the art that various modifications and variations can be made in the application of the present invention and the construction of this invention without departing from the scope or spirit of the invention. As an example, the foot portion of the shoe could be made from other lightweight materials, and the wedge-shaped calk could be made from various steel alloys and plastic resins. Furthermore, the shoe could include preformed toe clips or threaded holes in the foot portion to accept removable studs to increase the shoe's traction.

Other embodiments of the invention will be apparent to those skilled in the art from consideration of the specification and the practice of the invention disclosed herein. It is intended that the specification and examples be considered as exemplary only, with a true scope and spirit of the invention being indicated by the following claims.

What is claimed is:

1. A horseshoe for attachment to a horse's hoof comprising:
   a U-shaped foot portion forming the body of the shoe, said foot portion including a flat for lying against the horse's hoof and an inside, inclined surface opposite said flat,
   a continuous calk running along substantially the entire length of said foot portion and including a wedge-shaped portion having a pointed ridge projecting beyond said foot portion opposite to and at a constant distance from said flat, said continuous calk including an inside, inclined face and an outside, inclined face on opposites sides of said ridge, said inside, inclined face and said inside, inclined surface of said foot portion forming a continuous inclined surface extending in cross section from said ridge to the inner periphery of said foot portion, and
   means for securely attaching said continuous calk to said foot portion.

2. The horseshoe of claim 1 wherein said foot portion is aluminum and said calk is steel.

3. The horseshoe of claim 1 wherein said foot portion is constituted of a material which is lighter in weight than the material of said calk.

4. The horseshoe of claim 1 wherein said calk has a constant cross section along its length.

5. The horseshoe of claim 1 wherein said attaching means comprises:
- a continuous groove formed along substantially the entire length of said foot portion on the side opposite to said flat and
- a continuous rib formed along substantially the entire length of said calk opposite to said ridge and securely fitted within said continuous groove.

6. The horseshoe of claim 5 wherein said calk is press-fitted into said foot portion.

7. The horseshoe of claim 1 wherein the inside, inclined face of said wedge-shaped portion is inclined at an angle of 50° to a line through said ridge and perpendicular to said flat, and the outside, inclined face of said wedge-shaped portion is inclined at an angle of 20° to said line.

8. The horseshoe of claim 1 further comprising a plurality of nail holes formed in said foot portion exterior of the outer periphery of said calk.

9. A horseshoe for attachment to a horse's hoof comprising:
- a wide aluminum U-shaped foot portion forming the body of the shoe, said foot portion including a flat for lying against the horse's foot and an inside, inclined surface opposite said flat,
- a continuous groove formed along substantially the entire length of said foot portion on the side opposite to said flat,
- a continuous steel calk running along substantially the entire length of said foot portion and including a wedge-shaped portion having a pointed ridge projecting beyond said foot portion opposite to and at a constant distance from said flat, said continuous calk including an inside, inclined face and an outside, inclined face on opposite sides of said ridge, said inside, inclined face and said inside, inclined surface of said foot portion forming a continuous inclined surface extending in cross section from said ridge to the inner periphery of said foot portion, and
- a continuous rib formed along substantially the entire length of said calk opposite to said ridge and securely fitted within said continuous groove.

10. The horseshoe of claim 9 wherein the inside, inclined face of said wedge-shaped portion is inclined at an angle of 50° to a line through said ridge and perpendicular to said flat, and the outside, inclined face of the wedge-shaped portion is inclined at an angle of 20° to said line.

* * * * *